G. C. & C. E. JOHNSON.
DUST SPRAYING MACHINE.
APPLICATION FILED MAY 8, 1913.
1,118,286.
Patented Nov. 24, 1914.
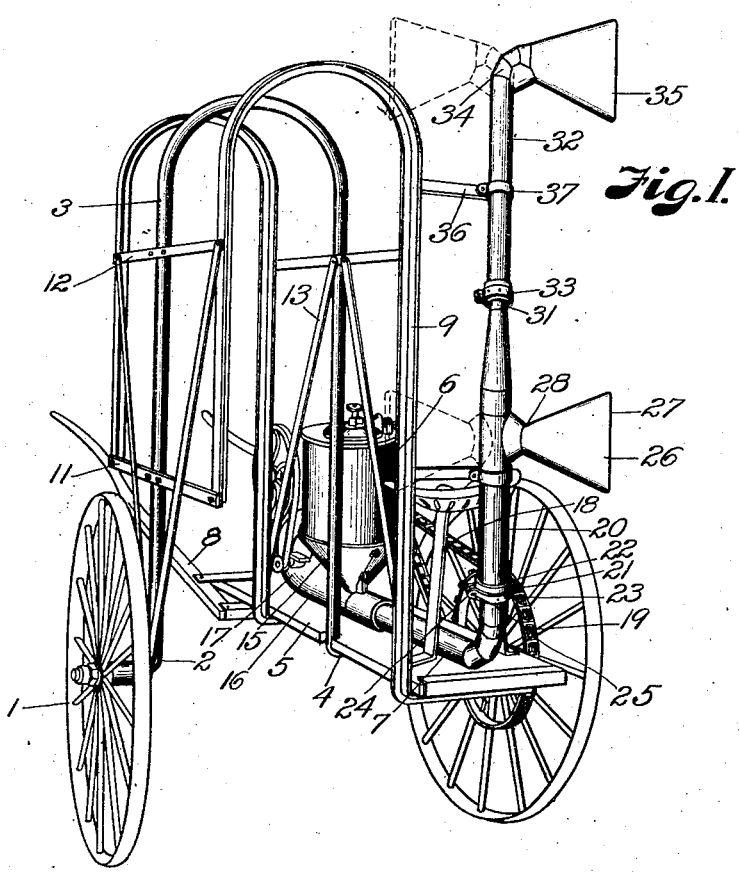
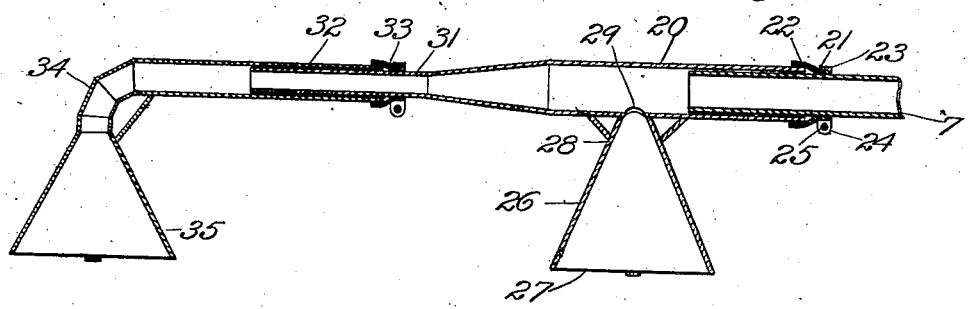
WITNESSES:
Arthur W. Caps.
Leta E. Coats.
INVENTORS
G. C. Johnson.
C. E. Johnson.
Arthur C. Brown
ATTORNEY

UNITED STATES PATENT OFFICE.

GEORGE C. JOHNSON AND CHARLES E. JOHNSON, OF KANSAS CITY, MISSOURI, ASSIGNORS TO DUST SPRAYER MANUFACTURING COMPANY, OF KANSAS CITY, MISSOURI, A CORPORATION OF MISSOURI.

DUST-SPRAYING MACHINE.

1,118,286.  Specification of Letters Patent. Patented Nov. 24, 1914.

Application filed May 8, 1913. Serial No. 766,354.

*To all whom it may concern:*

Be it known that we, GEORGE C. JOHNSON and CHARLES E. JOHNSON, citizens of the United States, residing at Kansas City, in the county of Jackson and State of Missouri, have invented certain new and useful Improvements in Dust-Spraying Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to a dust spraying machine, and more particularly to an apparatus for spraying insecticide onto plants or trees, the present apparatus being especially designed for spraying field corn, and the principal object of the invention being to provide an apparatus which may be driven through a field of corn without injuring the stalks, and from which the insecticide or dust may be blown onto the stalks during the travel of the machine. In accomplishing this object we have provided improved details of structure, the preferred form of which is illustrated in the accompanying drawings, wherein:—

Figure I is a perspective view of a dust spraying machine, constructed according to our invention, the dotted lines illustrating the adjustment of the nozzles. Fig. II. is a longitudinal sectional view of the nozzles. Fig. III is an enlarged detailed perspective of the clamp for holding the nozzle sections in adjusted position.

Referring more in detail to the parts:—1 designates ground wheels upon which the apparatus is mounted, and 2 an axle which is carried by the ground wheels and comprises an upwardly arched portion 3, which is adapted for extending over stalks of corn when the machine is traveling through a field, the arch being adapted for extending over stalks of considerable height so as to avoid injury thereto. The axle has a horizontal section 4, lying adjacent to one of the wheels, and mounted on this section is a platform 5 which extends forwardly and back from the axle and supports the dust receptacle 6, and conduit 7, and carries the shafts 8. Supplemental bars 9 are fixed to the platform, forwardly and back of the axle, and extend up and over in the plane thereof, the outer ends of the bars preferably terminating above the top of the ground wheels and being connected with the outer end of the axle arch by a cross-brace 11; similar cross-braces 12 connecting the bars with the axle at various points throughout the arch, and diagonal braces 13 being extended from the outer bearings of the axle to the arched bars and from the inner axle standard to the platform 5.

The dust receptacle comprises a drum, within which dust or insecticide may be contained and having a hopper bottom 15, mounted on the nozzle 16 of a fan blower 17, which is driven from a chain 18 that is run over a sprocket wheel 19 on one of the ground wheels, so that dust passing through the hopper bottom is blown through the nozzle into the conduit 7, the receptacle also comprising suitable stirring mechanism (not shown) for preventing dust from clogging in the hopper bottom.

A distributer conduit connects with the blower nozzle and is turned upwardly at the rear of the platform, where it carries a telescoping section 20, that may be held in adjusted position on the base section by a clamp 21, comprising a leather or like collar 22, which is fixed on a metal ring 23, having ears 24, connected by a bolt 25. The leather collar and metal ring are split so that they expand when the parts are to be adjusted and may be brought into close relation when the ears are drawn by the bolt 25; the free portion of the leather collar being adapted to expand to receive the end of the telescoping section 20, so that said section may be supported on the clamp, but be free to revolve thereon to provide for pivotal adjustment of the delivery nozzle 26, which is carried on the telescoping section. The nozzle 26 has a flaring mouth 27 and a contracted inner end 28, which is secured to the telescoping section and communicates with an aperture 29, through which dust or insecticide is delivered from the conduit to the nozzle to be blown from the machine.

The outer end of the telescoping section 20 is contracted and provided with a neck 31, to which another telescoping nozzle section 32 is applied and adapted to be held in adjusted position by a clamp 33 of the same construction as the first clamp 21. The outer telescoping section 32 has a laterally turned end 34, provided with a discharge nozzle 35, like the lower nozzle 26, and said upper section is braced from one of the arch braces 9 by a metal strap 36, which is fixed to the arch base and has a collar 37 inclosing the section 32, the connection being loose, however, in order to enable the conduit section to slide vertically when vertical adjustment is desired.

In using the machine, presuming the parts to be constructed and assembled as described, with the receptacle on the platform containing suitable insecticide or medicated dust, the machine is driven through a field of standing corn so that the arched portion of the axle will travel over one row of stalks, while the ground wheels travel between the rows. When the machine is in motion, the blower is operated through the gearing from one of the ground wheels and dust passing through the hopper bottom of the receptacle into the blower nozzle is forced out through the conduit and up to the telescoping section, from which it passes into the laterally directed nozzle, to be blown therefrom onto the stalks of grain.

As the same machine will be used for grain when the stalks are at different stages of their growth, it is necessary to adjust the discharge nozzles to properly apply the dust; this adjustment being accomplished by sliding the telescoping sections on their mountings and adjusting the clamps on the mountings so as to hold the telescoping sections at the desired height. As the material delivered from the nozzles is a fine dust or powder, it is apparent that the wind will carry same from the machine, and it is therefore necessary to adjust the nozzles so that they will deliver in the directions in which the wind is blowing. This adjustment is secured by mounting the telescoping sections loosely on their carrying parts, so that the said sections may be adjusted to direct the delivery nozzles in the proper direction, the leather collars on the supporting clamps permitting the sections to be turned pivotally thereon, in order to secure this adjustment. With the construction described, the machine may be driven from one end of the field to the other and back again; the nozzles being turned half around before starting on the return travel, in order to meet the opposite wind conditions.

It is apparent that while we have described the machine as adapted for treating field corn, it may be used for other grain, in nurseries where the trees and shrubs are planted in rows, and for treating other growing plants.

Having thus described our invention, what we claim is new herein, and desire to secure by Letters-Patent, is:—

1. In a machine of the character described, running gear comprising an axle having integral arch and horizontal end portions, supplemental bars spaced from the axle and adapted for coöperation therewith to form a platform support, a platform mounted on one of the horizontal end portions of said axle and on said bars, and means connecting the supplemental bars with the axle above the platform.

2. In a machine of the character described, running gear comprising an axle having an arched portion, and having end portions of unequal length integral with the arched portion, supplemental bars spaced from the arched portion and longer end of the axle, a platform supported by the longer portion of the axle, and by said bars, and means connecting the supplemental bars with the axle above the platform.

3. In a machine of the character described, running gear comprising an axle having horizontal end members of unequal length, and having an upwardly arched portion integral with and connecting said end members, a platform fixed on the longer end member of the axle, and supplemental bars having arched portions spaced from and connected with the arched portion of the axle, and end portions underlying the platform and connected therewith to brace the platform, substantially as set forth.

4. In a machine of the character described, running gear comprising an axle having an upwardly arched portion adjacent one end, and having horizontal end members integral with the arched portion, supplemental bars having arched portions paralleling but spaced from the arched portion of the axle and having horizontal members paralleling the longer end of the axle, a platform mounted on the end portions of said axle and on said bars, and means connecting the supplemental bars with the axle above the platform.

5. In a machine of the character described, running gear comprising an axle, having a platform supporting member and an arch rising at the side of said supporting member, a platform supported on said member, supplemental bars having end members underlying the ends of the platform and arched portions paralleling the arched part of the axle, and means connecting the supplemental bars with the axle above the platform.

6. In a machine of the character described, running gear comprising an axle, having a platform supporting member and an arch rising at the side of said supporting member, a platform supported on said member, and supplemental bars having end members underlying the ends of the platform and arched portions paralleling the arched part of the axle with their outer ends terminating above the plane of the platform and connected with the axle above the platform.

7. In a machine of the character described, a supporting platform, a blower mounted on said platform, a distributer conduit connected with the blower and rising vertically from the platform, and a plurality of nozzles arranged at spaced intervals throughout the height of the distributer conduit.

8. In a machine of the character described, a supporting platform, a blower mounted on said platform, a distributer conduit connected with the blower and rising vertically from the platform, and a plurality of nozzles arranged at spaced intervals throughout the height of the common distributer conduit, and adapted for independent lateral adjustment.

9. In a machine of the character described, a platform, a blower mounted on said platform and provided with a conduit, a dust receptacle adapted for delivering material into said conduit, a distributing conduit connected with the blower conduit and comprising a distributing conduit section connected with the blower conduit and extending vertically from the platform and having pivotal and sliding mounting and adapted for longitudinal and pivotal adjustment, a laterally directed nozzle opening from said distributer conduit section, a conduit section mounted on the first named distributer section and adapted for longitudinal and pivotal adjustment thereon, and a laterally directed nozzle on said last named section.

10. In a machine of the character described, a platform, running gear comprising an arched axle having a horizontal end portion for supporting the platform and an arched part at the side of and rising above the plane of the platform, braces paralleling the arched part with their outer ends terminating above the plane of the platform, and V-braces connected with the outer end of the axle and diverging upwardly to and connecting with the first named braces, and other V-braces connected with the axle and diverging downwardly to the horizontal end portions of the first named braces, substantially as set forth.

In testimony whereof we affix our signatures in presence of two witnesses.

GEORGE C. JOHNSON.
CHAS. E. JOHNSON.

Witnesses:
ARTHUR W. CAPS,
LETA E. COATS.